(12) United States Patent
Schmidt et al.

(10) Patent No.: US 10,641,298 B2
(45) Date of Patent: May 5, 2020

(54) HYDRAULIC CONTROL VALVE FOR CONTROLLING PRESSURE DROP ACROSS MOTORS

(71) Applicant: HydraForce, Inc., Lincolnshire, IL (US)

(72) Inventors: Travis Schmidt, Oregon City, OR (US); Scott Parker, Victoria, MN (US); Joel Mekkes, Traverse City, MI (US)

(73) Assignee: HydraForce, Inc., Lincolnshire, IL (US)

( * ) Notice: Subject to any disclaimer, the term of this patent is extended or adjusted under 35 U.S.C. 154(b) by 49 days.

(21) Appl. No.: 15/729,277

(22) Filed: Oct. 10, 2017

(65) Prior Publication Data

US 2018/0100522 A1    Apr. 12, 2018

Related U.S. Application Data

(60) Provisional application No. 62/406,267, filed on Oct. 10, 2016.

(51) Int. Cl.

| *F15B 13/07* | (2006.01) |
| *F16H 61/4043* | (2010.01) |
| *F16H 61/456* | (2010.01) |
| *F16H 61/4008* | (2010.01) |
| *F15B 11/16* | (2006.01) |
| *F15B 13/02* | (2006.01) |

(Continued)

(52) U.S. Cl.
CPC .............. *F15B 13/07* (2013.01); *F15B 11/16* (2013.01); *F15B 13/024* (2013.01); *F16H 61/4008* (2013.01); *F16H 61/4043* (2013.01); *F16H 61/456* (2013.01); *F16K 11/0716* (2013.01); *F15B 13/021* (2013.01); *F15B 2211/41581* (2013.01); *F15B 2211/526* (2013.01); *F15B 2211/7058* (2013.01); *F15B 2211/7121* (2013.01); *F16K 17/0406* (2013.01)

(58) Field of Classification Search
CPC ........ F15B 11/16; F15B 13/07; F16H 61/444; F16H 61/4043; F16H 61/456
See application file for complete search history.

(56) References Cited

U.S. PATENT DOCUMENTS

| 3,424,057 A | 1/1969 | Schweizer |
| 3,920,034 A * | 11/1975 | Byers, Jr. ................ F15B 11/16 |
| | | 137/115.03 |

(Continued)

FOREIGN PATENT DOCUMENTS

GB    1174252 A    12/1969

OTHER PUBLICATIONS

United States and Patent and Trademark Office, International Search Report and the Written Opinion in International Application No. PCT/US2017/055923 (dated Jan. 2, 2018).

*Primary Examiner* — Michael Leslie
*Assistant Examiner* — Daniel S Collins
(74) *Attorney, Agent, or Firm* — Leydig, Voit & Mayer, Ltd.

(57) ABSTRACT

A hydraulic control valve maintains the pressure at a control port at a desired percentage of the pressure at two other ports as the pressure at the two other ports varies. Upon the pressure at the control port reaching a predetermined pressure setting, a fourth port will open to maintain the control port at a second desired percentage of the two other ports.

19 Claims, 5 Drawing Sheets

(51) Int. Cl.
*F16K 11/07* (2006.01)
*F16K 17/04* (2006.01)

(56) References Cited

U.S. PATENT DOCUMENTS

| | | |
|---|---|---|
| 4,325,400 A | 4/1982 | Wynne |
| 5,778,929 A | 7/1998 | Ishizaki et al. |
| 2004/0089355 A1 | 5/2004 | Nirasawa et al. |

* cited by examiner

HYDRAULIC CONTROL VALVE FOR CONTROLLING PRESSURE DROP ACROSS MOTORS

CROSS-REFERENCE TO RELATED APPLICATIONS

This patent application claims the benefit of priority to U.S. Provisional Patent Application No. 62/406,267, filed Oct. 10, 2016, and entitled, "Hydraulic Control Valve For Controlling Pressure Drop Across Motors," which is incorporated in its entirety herein by this reference.

TECHNICAL FIELD

This patent disclosure relates generally to a hydraulic control valve and, more particularly, to a hydraulic control valve for controlling pressure drop across motors in which the pressure at a control port of the valve varies at a first rate over a first range of pressure differentials and varies at a second rate over a second range of pressure differentials.

BACKGROUND

Traction control systems for vehicles have utilized many different configurations. In some systems, a hydrostatic drive can utilize hydraulic motors in a series hydraulic circuit. Other systems configure the hydraulic motors in a parallel hydraulic circuit. Parallel hydrostatic drive systems have been further refined by utilizing flow dividers to assist in maintaining the desired traction to each wheel. In some instances, it may be desirable for the difference between the pressure drop across a pair of motors to change based upon operating conditions experienced by the vehicle.

For example, when controlling two motors in series, one of the motors tends to do most or all of the work. This imbalance can be especially true when the motors have case drains, or when the motors have varying speeds (such as, when a vehicle rounds a corner, for example). Also, as parameters change, it would be advantageous for the work done by the different motors to change based on the different conditions (such as, weight distribution or the angle of the machine (e.g., hill climb).

Series and parallel circuits have been used to control two motors. In series motor circuits, the pressure is additive in that the pressure available to the system must be shared by all motors in series. Motors in a series circuit must also be able to accommodate back pressure. Further, in series motor circuits, the flow through all motors is equal. When a vehicle is turning (such as around a corner), the outside wheels spin faster than the inside wheels (which follow a tighter turning radius). Failing to accommodate this can lead to the outside wheels scuffing the surface, or even cavitating the motors.

Parallel motor circuits typically use flow divider(s) to ensure all wheels spin, not just the one with no traction. This configuration can have the same limitation as a series motor circuit: the outside motors require more flow when the vehicle turns. Flow dividers can be a strain on the system (causing pressure drop) in low speed conditions, which can cause operation problems for vehicles operating in a creep mode, such unwanted wheel slip, for example.

It will be appreciated that this background description has been created by the inventor to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure, in one aspect, is directed to embodiments of a hydraulic control valve configured to permit a non-linear change in the pressure drop across different motors in a hydrostatic drive without requiring complex control circuitry and components. Such solution will reduce the complexity and cost of the hydrostatic drive while maintaining equivalent or improved performance compared to existing solutions.

In one embodiment, a hydraulic control valve includes a body, a spool, and a relief valve. The body defines a bore, a first port, a second port, a third port, and a fourth port.

The spool is slidably disposed with the bore for directing hydraulic fluid between the first, second, and third ports. The spool includes a first fluid communication passage fluidly connected to the first port, a second fluid communication passage fluidly connected to the second port, and a third fluid communication passage fluidly connected to the third port.

The relief valve is movable between an open position and a closed position to control flow through the fourth port In another embodiment, a hydrostatic drive system includes a pump, a first motor, a second motor, and a hydraulic control valve. The first and second motors are connected in series.

The hydraulic control valve includes a body, a spool, and a relief valve. The body defines a bore, a first port fluidly connected to a tank return, a second port fluidly connected to the second motor, and a third port fluidly connected to the first motor.

The spool is slidably disposed with the bore for directing hydraulic fluid between the first, second, and third ports. The spool includes a first fluid communication passage fluidly connected to the first port, a second fluid communication passage fluidly connected to the second port, and a third fluid communication passage fluidly connected to the third port.

The relief valve is movable between an open position and a closed position to control flow through the fourth port.

In still another embodiment, a method operating a hydraulic control valve includes providing a hydraulic control valve having a body, a spool, and a relief valve. The body defines a bore, a first port, a second port, and a third port, and a spool slidably disposed with the bore for directing hydraulic fluid between the first, second, and third ports. The spool includes a first fluid communication passage fluidly connected to the first port, a second fluid communication passage fluidly connected to the second port, a third fluid communication passage fluidly connected to the third port. A relief valve is fluidly connected to one of the first, second, and third ports and is movable between an open position and a closed position.

Hydraulic fluid is directed to the third port to move the spool from a biased position to a second operative position. At the second operative position, the first port has a first pressure, the second port has a second pressure, and the third port has a third pressure. If a pressure difference between the first pressure and the third pressure is less than a pressure threshold, the second pressure is based upon a first percentage of a pressure function. If the pressure difference is equal to or greater than the pressure threshold, the relief valve is moved to the open position, wherein the second pressure is based upon a second percentage of the pressure function.

Further and alternative aspects and features of the disclosed principles will be appreciated from the following detailed description and the accompanying drawings. As will be appreciated, the hydraulic valves, hydraulic circuits, and methods for controlling hydraulic fluid disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

Embodiments of a hydraulic valve constructed in accordance with principles of the present disclosure are adapted to control the operation of a pair of motors of a vehicle (e.g., telehandlers, backhoe loaders, wheel loaders, tractors, excavators). Embodiments of a hydraulic control system constructed in accordance with principles of the present disclosure can have the same or similar functionality as conventional circuits, but with reduced cost and complexity.

Embodiments of a hydraulic valve constructed in accordance with principles of the present disclosure can include a pressure splitting functionality that provides a variable splitting ratio that is adapted to change at different supply pressure conditions. In embodiments, the hydraulic valve is adapted to vary the pressure drop across each motor based on system (pump) pressure. The higher the pump pressure, the higher the ratio or pressure split. This way, when a vehicle equipped with a hydraulic control system including a hydraulic valve constructed according to principles of the present disclosure is climbing a hill, the available tractive effort or torque across the first motor in series will increase as the over-all pressure increases. Typically when climbing a hill, more weight is transferred over the rear axle, thus increasing the need for more tractive effort at the rear motors. Embodiments of a hydraulic valve constructed in accordance with principles of the present disclosure are adapted to allow the rear motors to develop more traction automatically by increasing the pressure split, the higher the over-all pressure.

Embodiments of a hydraulic valve constructed in accordance with principles of the present disclosure can be used to control the pressure drop across a pair of motors in series. The hydraulic valve is adapted to monitor inlet and return pressure to a pair of motors and is adapted to variably respond to those pressures to determine its setting. The hydraulic valve includes a control port that is adapted to have a setting that is approximately the average of the two monitored pressures (about at the midpoint between the inlet and return pressures). The hydraulic valve is adapted to sense the control pressure at one side of its spool and the average of the two monitored pressures at the other side of its spool. In embodiments, the pressure setting of the average of the two monitored pressures is achieved by sensing the pressure between two serial orifices internal to the valve that connect the inlet and return pressure to a pair of motors. In addition to the two serial orifices that are present in the valve, an additional orifice from the region below the spool opens at a desired pressure to allow additional flow to the return of the pair of motors. The opening of this additional orifice limits the control pressure even as the inlet pressure to the pair of motors increases. This additional orifice can be created by a variety of techniques, as one skilled in the art will appreciate, such as, by a ball becoming unseated from a seat when the pressure exceeds a spring preload or by a spool opening up the additional orifice when the pressure exceeds a spring preload, for example.

In embodiments, a hydraulic valve constructed according to principles of the present disclosure is adapted to control the pressure between the motors when the force balance on its spool causes the spool to shift to either add oil from the high pressure monitored port or remove oil and send it to the low pressure monitored port. In embodiments, a hydraulic valve constructed according to principles of the present disclosure is adapted to permit its control pressure to be adjusted mechanically to limit one motor's differential pressure.

Figure 1:
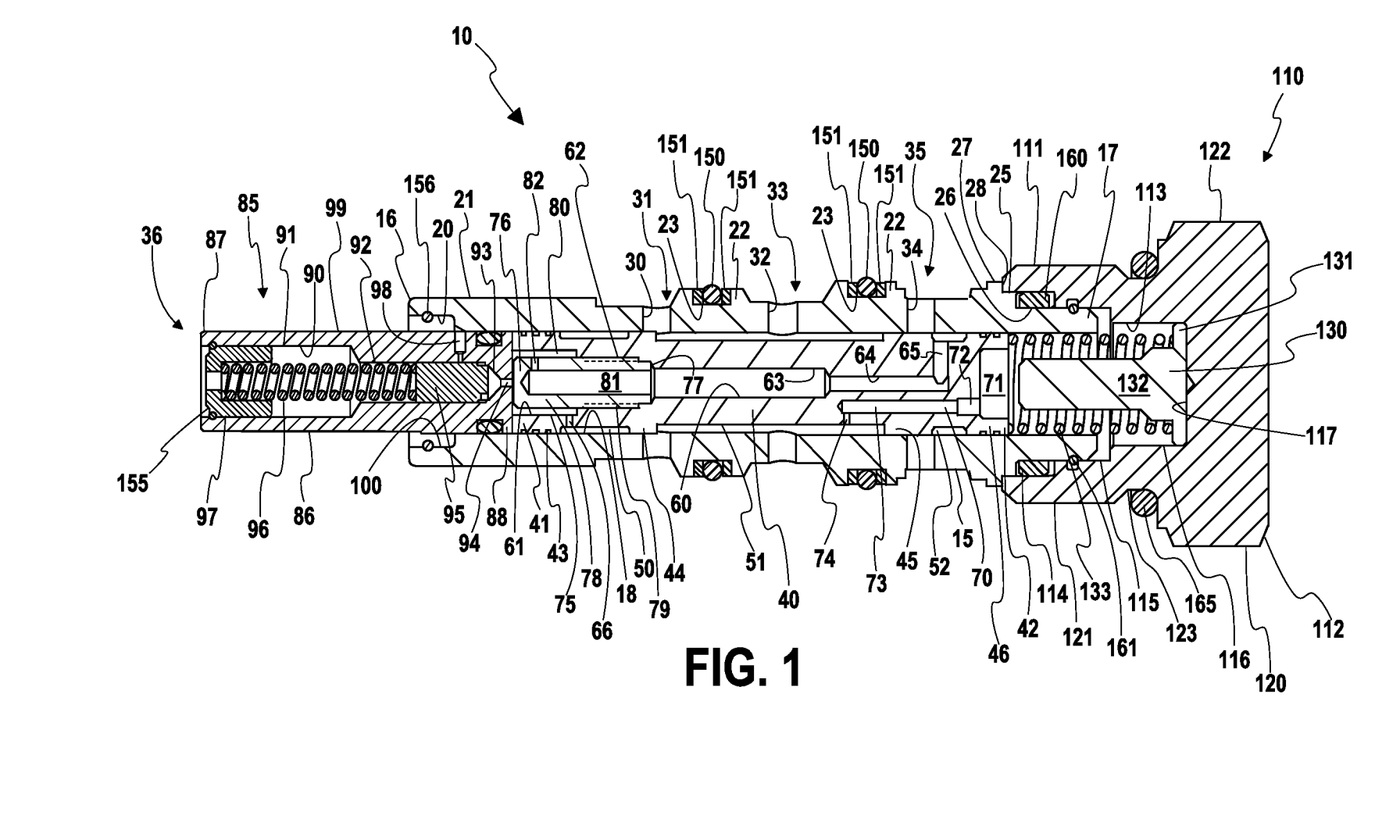
FIG. 1 is a cross-sectional view of an embodiment of a hydraulic control valve in accordance with principles of the present disclosure.

Turning now to the Figures, there is shown in FIG. 1 an embodiment of a hydraulic control valve 10 constructed according to principles of the present disclosure that is adapted to be used to control the pressure drop across a pair of motors in series. The control valve 10 includes a cage 15, which is hollow and generally cylindrical, and a spool 40, which is generally cylindrical and slidably disposed within the cage 15.

The cage 15 has a first end 16 and a second end 17, which is in opposing relationship to the first end 16. The cage 15 defines a central bore 18 that extends longitudinally between the first and second ends 16, 17. The bore 18 has an enlarged section 20 adjacent the first end 16.

In embodiments, an outer surface 21 of cage 15 can be adapted to be sealingly engaged with a suitable, mating valve body or housing. The illustrated outer surface 21 includes a pair of sealing sections 22 that are in spaced relationship to each other. Each sealing section 22 includes an annular groove 23 configured to accept therein a suitable O-ring 150 and a support or back-up ring 151 on opposite sides of each O-ring. The outer surface 21 of the cage 15 is stepped generally adjacent the second end 17 with a first annular surface 25 that defines a first annular sealing surface 26 between the surface 25 and the second end and a second projection 27 that defines an annular stop surface 28.

The cage 15 defines a set of first radial bores 30 that extends between the outer surface 21 and the bore 18 to define a first port 31. The first radial bores 30 are disposed in circumferentially spaced apart relationship to each other around the cage 15. The cage 15 defines a set of second radial bores 32 that extends between the outer surface 21 and the bore 18 to define a second port 33. The second radial bores 32 are disposed in circumferentially spaced apart relationship to each other around the cage 15. The cage 15 defines a set of third radial bores 34 that extends between the outer surface 21 and the bore 18 to define a third port 35. The third radial bores 34 are disposed in circumferentially spaced apart relationship to each other around the cage 15. In embodiments, the first port 31 can comprise, be connected to or operate as, a return side from the motors; the second port 33 can comprise, be connected to or operate as, a control; and the third port 35 can comprise, be connected to or operate as, as a supply side to the motors.

The spool 40 has a first end 41 and a second end 42 in opposing relationship to the first end 41 thereof. An outer surface of the spool 40 includes a plurality of lands and intervening grooves between the first end 41 and the second end 42. More specifically, the outer surface 41 includes, sequentially from the first end 41 to the second end 42, a first annular land 43 adjacent the first end, a second annular land 44 spaced from the first land, a third annular land 45 spaced from the second land, and a fourth annular land 46 spaced from the third land and adjacent the second end. A first annular groove 50 is disposed between the first land 43 and the second land 44, a second annular groove 51 is disposed between the second land and the third land 45, and a third annular groove 52 is disposed between the third land and the fourth land 46.

A first, stepped bore 60 extends along an axial centerline of the spool 40 from the first end 41 towards the second end 42. The stepped bore 60 includes, in sequence from the first end 41 towards the second end 42, an enlarged first section 61, a threaded second section 62 having a smaller diameter than the first section, a third section 63 having a smaller diameter than the second section, and a fourth section 64 having a smaller diameter than the third section. A radial bore 65 extends between the third annular groove 52 and the fourth section 64 to fluidly connect the bore 60 with the third annular groove 52. A radial bore 66 extends between the first annular groove 50 and the enlarged first section 61 to fluidly connect the bore 60 with the first annular groove. The radial bore 66 is configured to provide a desired pressure drop or differential as hydraulic fluid passes from the enlarged first section 61 to the first annular groove 50. The cage 15 and spool 40 are configured so that the third annular groove 52 (and thus bore 60) is in fluid communication with the third radial bore 34 of the cage regardless of the position of the spool relative to the cage.

A second, stepped bore 70 extends from the second end 42 of spool 40 towards the first end 41. The stepped bore 70 includes, in sequence from the second end 42 towards the first end 41, an enlarged first section 71, a second section 72 having a substantially smaller diameter than the first section, and a third section 73 having a smaller diameter than the second section. The second section 72 can be offset from the axial centerline of the spool 40. A radial bore 74 extends between the second annular groove 51 and the third section 73 to fluidly connect the bore 70 with the second annular groove. The radial bore 74 is configured to provide a desired pressure drop or differential as hydraulic fluid passes from the second annular groove 51 to the stepped bore 70. The first section 71 interacts with the central bore 18 adjacent the second end 17 of cage 15 and the bore 113 of cap 110 to define a fluid receiving chamber as discussed in further detail below.

An insert 75 is disposed in the first section 61 and the second section 62 of the bore 60. The insert 75 includes a first end 76 and a second opposite end 77 with a first section 78 extending from the first end towards the second end and a threaded second section 79 extending from second end towards the first end. The first section 78 has an outer diameter smaller than the inner diameter of first section 61 of the bore 60 to permit hydraulic fluid to pass through the opening 80 between the spool 40 and the insert 75. The outer surface of the second section 77 includes threads configured to threadingly engage the threads of the inner surface of the second section 62 of the bore 60. An axial bore 81 extends from the second end 77 of the insert 75 towards the first end 76. A radial bore 82 extends through the first section 78 of the insert 75 to the axial bore 81. By positioning the insert 75 within the bore 60 of the spool 40, the third annular groove 52 is fluidly connected to the opening 80 between the spool and the insert. The opening 80 operates as or defines a fluid receiving chamber as discussed in further detail below. The radial bore 82 is configured to provide a desired pressure drop or differential as hydraulic fluid passes from the enlarged axial bore 81 to the enlarged first section 61.

A relief valve 85 extends outwardly from the first end 16 of the cage 15 along the axial centerline of the cage and can operate as a fourth port 36. The relief valve 85 has a housing 86 with a first end 87 and a second, opposite end 88. The housing 86 has a stepped bore 90 therethrough that extends along an axial centerline of the valve housing. The bore 90 includes, in sequence from the first end 87 to the second end 88, an enlarged first section 91, a second section 92 having a smaller diameter than the first section, a tapered third section 93 that tapers towards the axial centerline of the valve housing 86, and a fourth section 94 smaller than the second section that intersects with the second end. The tapered third section 93 defines a valve seat for the relief valve 85.

An internal valve member or spool 95 is biased against or towards the valve seat by a biasing member such as a spring 96. The spring 96 is supported at an opposite end by a cylindrical retainer 97 that is retained within the enlarged first section 91 by an annular locking ring 155. Movement of the internal valve member 95 between a closed position at which the valve member engages the valve seat and an open position at which the internal valve member is spaced from the valve seat moves the relief valve between its closed and open positions. Although depicted as being generally cylindrical, the internal valve member 95 can have other configurations. In an additional embodiment, the internal valve member 95 can be spherical or ball-shaped.

A radial bore 98 extends between the outer surface 99 of the housing 86 and the second section 92 of the bore 90 to provide a path for hydraulic fluid that flows past the internal valve member 95. The outer surface 99 of the housing 86 has an annular locking flange 100 generally towards the second end 88 of the housing configured to be received in the enlarged section 20 of the bore 18 of the cage 15. A locking ring 156 interacts with the enlarged section 20 of the bore 18 and the locking flange 100 to lockingly retain the relief valve 85 at the first end 16 of the cage 15 with the bore 90 axially aligned with the spool 40.

A cap 110 is disposed at the second end 17 of the cage 15. The cap 110 has a first end 111 and a second opposite end 112 with a stepped bore 113 that extends from the first end towards the second end. The stepped bore 113 includes, in sequence from the first end 111 towards the second end 112, an enlarged first section 114, a second section 115 having a smaller diameter than the first section, and a third section 116 having a smaller diameter than the second section. The first section 114 is configured so that a portion thereof engages the outer surface 21 of the cage 15 with the first end 111 of the cap 110 abutting the stop surface 28 of the cage. An additional length of the first section 114 is spaced from the sealing surface 26. A resilient annular seal 160 can be positioned between the sealing surface 26 and the first section 114.

The second section 115 of the bore 113 is configured to be disposed adjacent the sealing surface 26 of the outer surface 21 of the cage 15. A locking ring 161 can be positioned in grooves within the sealing surface 26 and the second section 115 to retain the cap 110 on the second end of the cage 15. An alignment member 130 having an enlarged base 131 and an elongated cylindrical support portion 132 can be positioned in the bore 113 and extends from an inner end 116 of the bore towards the first end 111. A biasing member such as a spring 133 extends around the support member 132 and between the base 131 and the second end 42 of the spool 40 to bias the spool away from the inner end 117 of the cap 110.

The outer surface 120 of the cap 110 includes a threaded section 121 adjacent the first end 111 and a tool engagement section 122 adjacent the second end 112. The tool engagement section 122 can be configured with a hexagonal cross-section to facilitate engagement with a tool to screw the control valve 10 into a bore (not shown) in a valve housing. The outer surface 120 further includes an annular recess 123 between the threaded section 121 and the tool engagement section 122 with an O-ring 165 disposed therein to create a seal between the control valve 10 and the valve housing.

In operation, the control valve 10 is configured so that the spool 40 is biased to block hydraulic fluid flow from the third port 35 to the second port 33 and allow hydraulic fluid to flow from the second port to the first port 31. Pressure applied to the third port 35 by the hydraulic fluid shifts or moves the spool 40 (to the right as viewed in FIG. 1) to block flow to the first port 31 from the second port 33 and permits flow between the third port 35 and the second port 33 until the pressure at the second port is at the midpoint or average of the pressure at the first port and the third port.

More specifically, hydraulic fluid flows through the third port 35, into the third annular groove 52, and into first stepped bore 60. Hydraulic fluid within the first stepped bore 60 flows through the radial bore 82 and into the opening or chamber 80 between the spool 40 and the insert 75. Hydraulic fluid within the opening or chamber 80 provides a pressure that forces the spool 40 away from the relief valve 85 (to the right in FIG. 1) and towards the cap 110. Movement of the spool 40 away from the relief valve 85 also compresses the spring 133.

As the spool 40 moves towards the cap 110, the second annular groove 51 becomes aligned with the radial bores 34 so that hydraulic fluid from the third port 35 enters the second annular groove to provide fluid flow between the second port 33 and the third port 35. Hydraulic fluid within the second annular groove 51 passes through the radial bore 74 and into the second stepped bore 70. Hydraulic fluid within the enlarged first section 71 of the second stepped bore 70 interacts with the central bore 18 and the bore 113 of cap 110 to define a fluid receiving chamber and fluid within that chamber provides a pressure that forces the spool 40 away from the cap 110 and towards the relief valve 85, in opposition to the pressure within opening 80.

From the foregoing, it may be understood that hydraulic fluid within opening 80 provides a force at one end of the spool 40 and the hydraulic fluid within the chamber defined by the enlarged first section 71, the central bore 18 and the bore 113 of cap 110 together with the spring 133 provide a force at the opposite end of the spool. Thus, the spool 40 will be positioned within the central bore 18 of cage 15 at a location at which the forces on opposite ends of the spool 40 are equal. In embodiments, the spring 133 may provide only a minimal force and the primary alignment of the spool 40 is achieved as a result of the balance in pressure between the enlarged first section 71 and the opening 80.

In embodiments, the control valve 10, including the various fluid passages of the spool 40 and the characteristics of the spring 133, is adapted or configured so that the pressure at the second port 33 is at the midpoint or average of the pressure at the first port 31 and the third port 35. In embodiments, the control valve 10 can be adapted or configured so that the pressure at the second port 33 is at a percentage of the average of the pressure at the first port 31 and the third port 35 other than 50 percent, if desired. The percentage of the pressure at the second port 33 relative to that of either the first port 31, the third port 35, or the difference between the first and third ports can be controlled or adjusted by configuring the size of the passageways within the spool 40, including radial bores 66, 74, 82.

When the pressure at the second port 33 reaches a predetermined pressure threshold or setting, the pressure within the opening 80 is sufficient to displace the internal valve member 95 away from the valve seat and compress the spring 96. Movement of the internal valve member 95 away from the valve seat opens the relief valve 85 and permits hydraulic fluid to flow through the fourth port 36 In doing so, hydraulic fluid flows through the fourth section of stepped bore 90, through the tapered third section 93, into the second section 92, and out the radial bore 98. Hydraulic fluid passing through the fourth port 36 can combine with the hydraulic fluid flowing from the second port 31 as part of the hydraulic circuit, such as while it flows back to the tank.

The pressure at the second port 33 will increase at a slower rate as pressure from a supply 176 (FIG. 3) through the third port 35 increases. More specifically, increased pressure at the third port 35 will be supplied or bled off through the fourth port 36 so that the pressure at the second port 33 does not increase at the same rate as an increase in the midpoint or average of the first port 31 and the third port 35. Upon the pressure at the second port 33 dropping below the predetermined pressure setting, the spring 96 will displace the internal valve member 95 against the valve seat to seal the fourth port 36 and the pressure at the second port 33 will be maintained at the midpoint or average (or other desired percentage) of the first port 31 and the third port 35.

In other words, the hydraulic control valve 10 maintains the pressure at the second port 33 at the midpoint or average of the first port 31 and the third port 35 even as the pressure difference at the first and third ports varies up to a predetermined control pressure setting at the second port. Once the pressure at the second port 33 reaches the predetermined pressure setting, the internal valve member 95 will be displaced from the valve seat 93 to open the fourth port 36 and permit hydraulic fluid to flow through the fourth port. As a result of the flow through the fourth port 36, subsequent increases in the difference between the pressure at the first port 31 and the third port 35 will result in a reduced increase in pressure at the second port 33. Once the difference between the pressure at the first port 31 and the third port 35 is reduced to a predetermined level, the internal valve member 95 will be re-seated on the valve seat 93 to close the fourth port 36.

Figure 2:
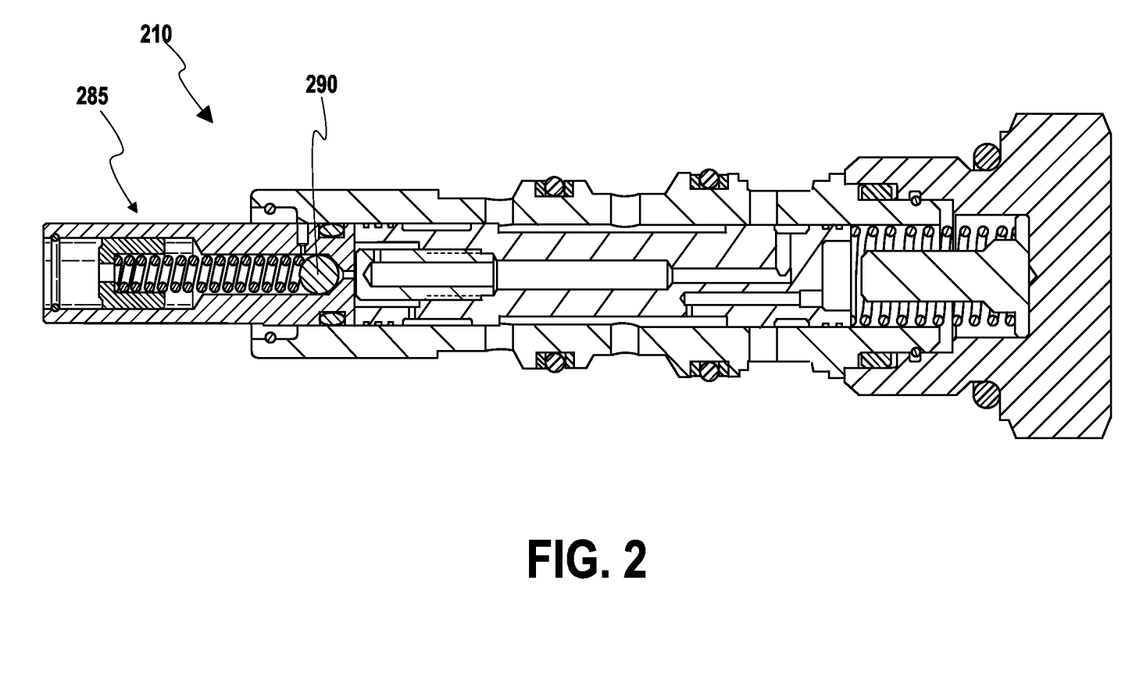
FIG. 2 is a cross-sectional view of another embodiment of a hydraulic control valve in accordance with principles of the present disclosure.

Referring to FIG. 2, another embodiment of a hydraulic control valve 210 constructed according to principles of the present disclosure is shown. The control valve 210 is adapted to be used to control the pressure drop across a pair of motors in series.

The control valve 210 includes a relief valve 285 having a spherical or ball-shaped internal valve member 295 rather than the cylindrically-shaped valve member 95 described above with respect to the control valve 10 described above. The control valve 210 can be similar in other respects to the control valve 10 of FIG. 1.

Figure 5:
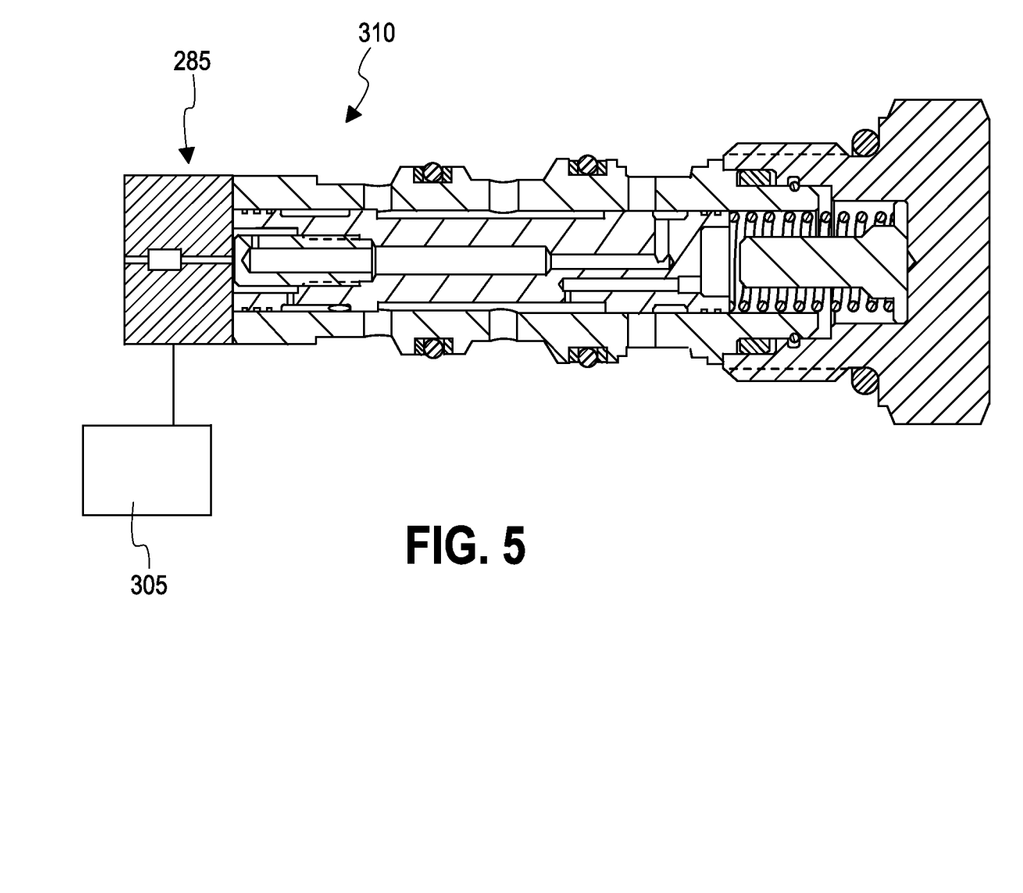
FIG. 5 is a cross-sectional view of still another embodiment of a hydraulic control valve in accordance with principles of the present disclosure.

In yet other embodiments of a hydraulic control valve 310 (FIG. 5) constructed according to principles of the present disclosure, the valve is arranged with an electro-proportional control valve (pressure or flow) 385 (FIG. 5) to control the flow through a variable sized orifice out of the fourth port 36 below the spool. The electro-proportional control valve 385 can include an electrical source 305, such as a current source, that is operative to control the characteristics of the electro-proportional control valve. This arrangement can allow for the remote, programmable control of the pressure (torque) splitting characteristics of the valve. In still other embodiments, the valve includes the use of a mechanical feedback to control the opening of the variable orifice. In further embodiments, the valve includes the use of a pilot pressure to control the size of the opening of the variable orifice.

Figure 3:
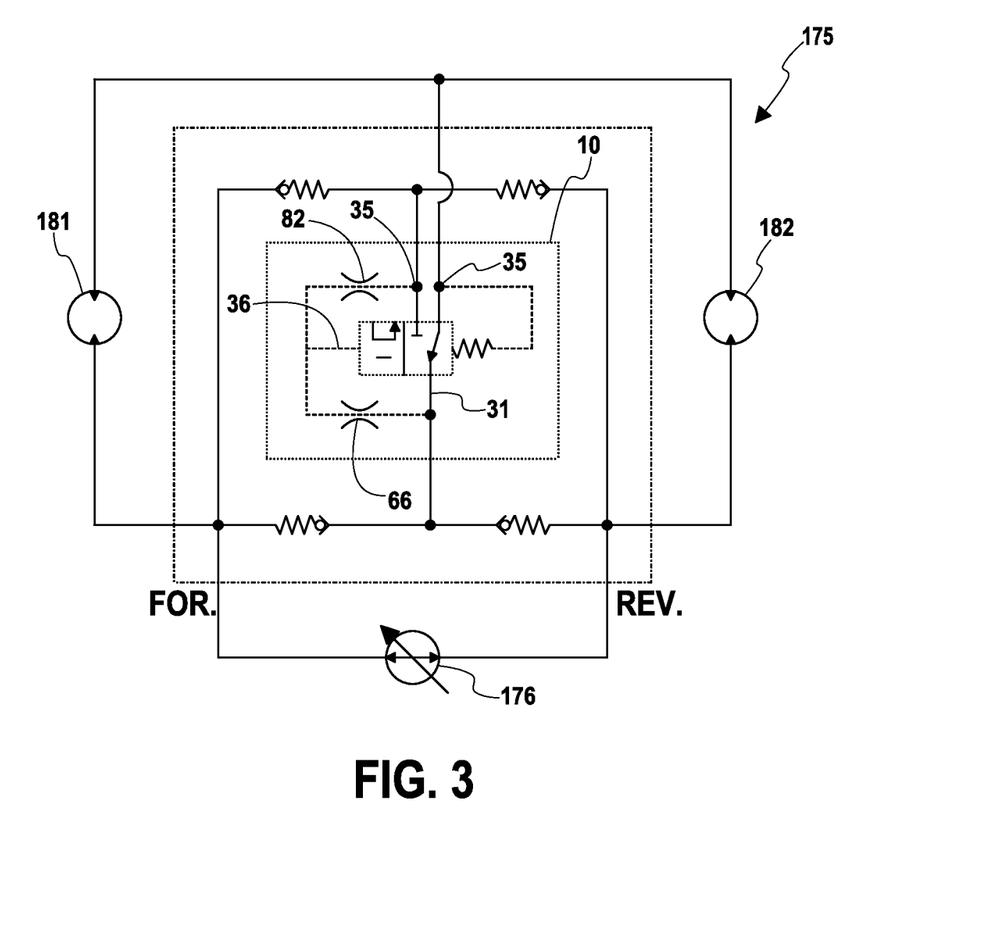
FIG. 3 is schematic view of an embodiment of a hydraulic circuit in accordance with principles of the present disclosure.

Referring to FIG. 3, there is shown an embodiment of a hydraulic circuit 175 constructed according to principles of the present disclosure. The hydraulic circuit 175 includes a pump 176 with the control valve 10 configured to control a pair of motors 181, 182 that are connected together in series. The first port 31 operates as the return or tank port, the second port 33 operates as a control port, and the third port 35 operates as a supply port. The fourth port 36 operates to reduce or bleed off pressure from the second port 33 as the difference between or average of the first and third ports 31, 35 surpasses a predetermined threshold pressure.

Figure 4:
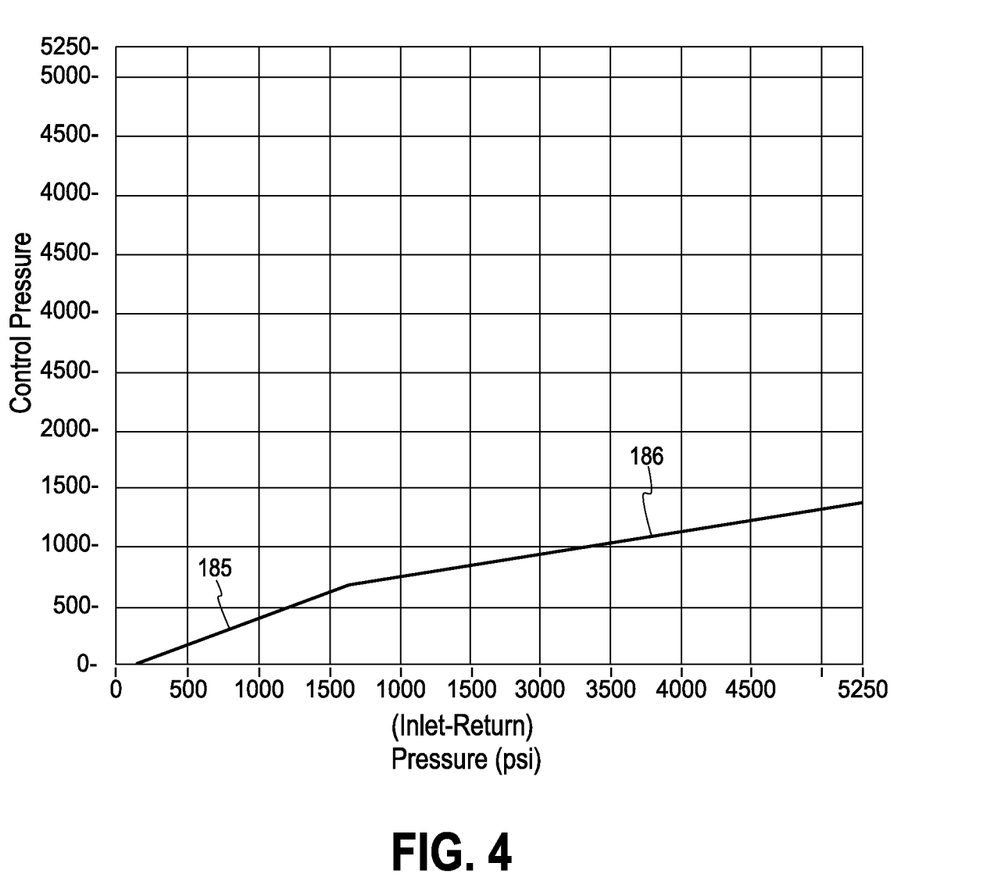
FIG. 4 is a plot of inlet return pressure versus control pressure for an exemplary performance curve of a hydraulic control valve constructed according to principles of the present disclosure.

Referring to FIG. 4, a representative performance curve of the control valve 10 in the hydraulic circuit 175 is shown. The x-axis depicts the difference between the pressure at the supply or third port 35 and the pressure at the return or first port 31. The y-axis depicts the pressure at the control or second port 33. As can be seen in FIG. 4, the first portion 185 of the curve has a first slope and the second portion 186 has a second slope that is less than the first slope. The location of the change in slope corresponds to the predetermined threshold pressure referenced above. In the embodiment represented by FIG. 4, the predetermined threshold pressure (and thus the location of the change in slope) occurs when the difference between the pressure at the first port 31 and the pressure at the third port 35 is approximately 1500 psi.

The control valve 10 can provide enhanced performance when traction control is needed. The control valve 10 can be adapted to efficiently split the pressure drop across the motors 181, 182. The control valve 10 can be adjusted to change the pressure drop across the motors 181, 182 as the machine climbs different angles. The ability to adjust the pressure drop from one motor to another can help accommodate the transfer of weight from one set of wheels to the other as the machine angle changes. One skilled in the art will discern additional details and features of the hydraulic valve 10 and the hydraulic circuit 175 upon review of FIGS. 3 and 4.

In embodiments, a hydraulic control valve constructed according to principles of the present disclosure is adapted to maintain the pressure at the control port as a percentage of another port or the difference between two ports. In embodiments, the hydraulic control valve maintains the pressure at the control port as a percentage of another port or the difference between two ports where that percentage starts to vary at a set pressure. In other words, the pressure at the control port can be based upon a pressure function such as the pressure of the return (tank) port, the pressure at the supply port, or based upon a difference between the pressures of the return (tank) port and the supply port.

In some of such embodiments, the hydraulic valve maintains the pressure at the control port as a percentage of another port or the difference between two ports where that percentage varies with an electro-proportional control current (either flow control valve or pressure control valve). In some of such embodiments, the hydraulic valve maintains the pressure at the control port as a percentage of another port or the difference between two ports where that percentage varies with a mechanical feedback. In some of such embodiments, the hydraulic valve maintains the pressure at the control port as a percentage of another port or the difference between two ports where that percentage varies with a pilot pressure.

In embodiments of a hydraulic control valve constructed according to principles of the present disclosure, the control valve includes a cage defining a supply port, a control port, and a return (tank) port. The control valve includes a spool with communication passages that allow the sensing of the control port pressure on one end, and a communication passage to the supply port pressure on the opposing side. The communication passage in the spool is connected to the supply port and contains a restriction (orifice). Furthermore, volume on the side of the spool with a communication connected to the supply port has a restricted communication passage to the return (tank) port. In addition, the volume on the side of the spool with a communication connected to the supply port has a second communication passage to the return (tank) port. The second communication passage is adapted to open at a predetermined pressure (spring preload controls a ball on seat, poppet on seat, or spool in bore, for example). The force balance on the spool causes the spool to either add or remove fluid from the referenced control port to maintain the desired pressure drop ratios across the three reference ports.

In embodiments, the volume on the side of the spool with a communication connected to the supply port has a communication passage to the return (tank) port that is controlled by means of an electro-proportional flow or a pressure control valve. In some embodiments, a fixed communication passage is present in addition to the electro-proportional controlled passage. The force balance on the spool causes the spool to either add or remove fluid from the referenced control port to maintain the desired pressure drop ratios across the three reference ports.

In embodiments, the volume on the side of the spool with a communication connected to the supply port has a communication passage to the return (tank) port with a variable restriction that is controlled by means of a mechanical feedback on the vehicle (such as, a weight on a pendulum that strokes a spool to open an orifice based on the incline of a vehicle, e.g.). In some embodiments, a fixed communication passage is present in addition to the electro-proportional controlled passage. The force balance on the spool causes the spool to either add or remove fluid from the referenced control port to maintain the desired pressure drop ratios across the three reference ports.

In embodiments, the volume on the side of the spool with a communication connected to the supply port has a communication passage to the return (tank) port with a variable restriction that is controlled by means of a pilot pressure on a spool or poppet. In some embodiments, a fixed communication passage is present in addition to the electro-proportional controlled passage. The force balance on the spool causes the spool to either add or remove fluid from the referenced control port to maintain the desired pressure drop ratios across the three reference ports.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hydraulic control valve, comprising:
   a body, the body defining a bore, a first port, a second port, a third port, and a fourth port;
   a spool, the spool being slidably disposed with the bore for directing hydraulic fluid between the first, second, and third ports, the spool including a first fluid communication passage fluidly connected to the first port, a second fluid communication passage fluidly connected to the second port, and a third fluid communication passage fluidly connected to the third port; and
   a relief valve, the relief valve being movable between an open position and a closed position to control flow through the fourth port, wherein the relief valve is fluidly disposed between the fourth port and one of the first fluid communication passage, the second fluid communication passage, and the third fluid communication passage.

2. The hydraulic control valve of claim 1, further comprising a first chamber in fluid communication with the third port for biasing the spool in a first direction, and a second chamber in fluid communication with the second port for biasing the spool in a second, direction opposite the first direction.

3. The hydraulic control valve of claim 2, wherein the first chamber is disposed at a first end of the spool and the second chamber is disposed at a second end of the spool.

4. The hydraulic control valve of claim 3, wherein the relief valve is disposed between the fourth port and one of the first and second chambers.

5. The hydraulic control valve of claim 2, further comprising an orifice between the third port and the first chamber to create a pressure differential between the third port and the first chamber.

6. The hydraulic control valve of claim 5, further comprising a second orifice between the first chamber and the first port to create a second pressure differential between the first chamber and the first port.

7. The hydraulic control valve of claim 1, further comprising a biasing member to bias the spool along the longitudinal axis towards the relief valve.

8. The hydraulic control valve of claim 1, wherein the relief valve comprises a valve seat, a movable valve member for engaging the valve seat, and a relief valve biasing member for biasing the valve member against the valve seat.

9. The hydraulic control valve of claim 1, wherein the relief valve comprises a variable sized orifice.

10. The hydraulic control valve of claim 9, wherein the relief valve comprises an electro-proportional control valve.

11. The hydraulic control valve of claim 1, wherein the body is an elongated cylindrical cage, the bore extends along a longitudinal axis of the cage, and the fourth port and the relief valve are disposed along the longitudinal axis.

12. The hydraulic control valve of claim 1, wherein the first port and the fourth port are fluidly connected and the hydraulic control valve is adapted so that the first port and the fourth port have equal pressures upon the relief valve being disposed in the open position.

13. A hydrostatic drive system comprising:
   a pump;
   a first motor;
   a second motor, the first and second motors being connected in series; and
   a hydraulic control valve comprising:
      a body, the body having a bore, a first port fluidly connected to a tank return, a second port fluidly connected to the second motor, and a third port fluidly connected to the first motor;
      a spool, the spool being slidably disposed with the bore for directing hydraulic fluid between the first, second, and third ports, the spool including a first fluid communication passage fluidly connected to the first port, a second fluid communication passage fluidly connected to the second port, and a third fluid communication passage fluidly connected to the third port; and
      a relief valve, the relief valve being movable between an open position and a closed position to control flow through the fourth port.

14. The hydrostatic drive system of claim 13, wherein the body is an elongated cylindrical cage, the bore extends along a longitudinal axis of the cage, and the fourth port and the relief valve are disposed along the longitudinal axis.

15. A method of operating a hydraulic control valve comprising:

providing a hydraulic control valve, the hydraulic control valve including a body, a spool, and a relief valve, the body defining a bore, a first port, a second port, a third port, and a fourth port, the spool being slidably disposed with the bore for directing hydraulic fluid between the first, second, and third ports, the spool including a first fluid communication passage fluidly connected to the first port, a second fluid communication passage fluidly connected to the second port, a third fluid communication passage fluidly connected to the third port, and the relief valve being movable between an open position and a closed position to control flow through the fourth port;

directing hydraulic fluid to the third port to move the spool from a first biased position to a second operative position, wherein at the second operative position, the first port having a first pressure, the second port having a second pressure, the third port having a third pressure, and the fourth port having a fourth pressure;

if a pressure difference between the first pressure and the third pressure is less than a pressure threshold, maintaining the relief valve at the closed position, wherein the second pressure is based upon a first percentage of a pressure function of at least one of the first and third ports; and if the pressure difference is equal to or greater than the pressure threshold, moving the relief valve to the open position, wherein the second pressure is based upon a second percentage of the pressure function.

16. The method of claim 15, wherein the pressure function is one of the first and third pressures.

17. The method of claim 15, wherein the pressure function is a difference between the first and third pressures.

18. The method of claim 15, wherein if the pressure difference between the first pressure and the third pressure is less than the pressure threshold, the second pressure is based upon the first percentage of the pressure difference and if the pressure difference is greater than the pressure threshold, the second pressure is based upon the second percentage of the pressure difference.

19. The method of claim 15, wherein if the pressure difference is less than the pressure threshold, the second pressure is equal to an average of the first pressure and the third pressure.

* * * * *